E. S. MAYLAND.
MUSICAL DEVICE.
APPLICATION FILED AUG. 6, 1913.
1,100,898.
Patented June 23, 1914.
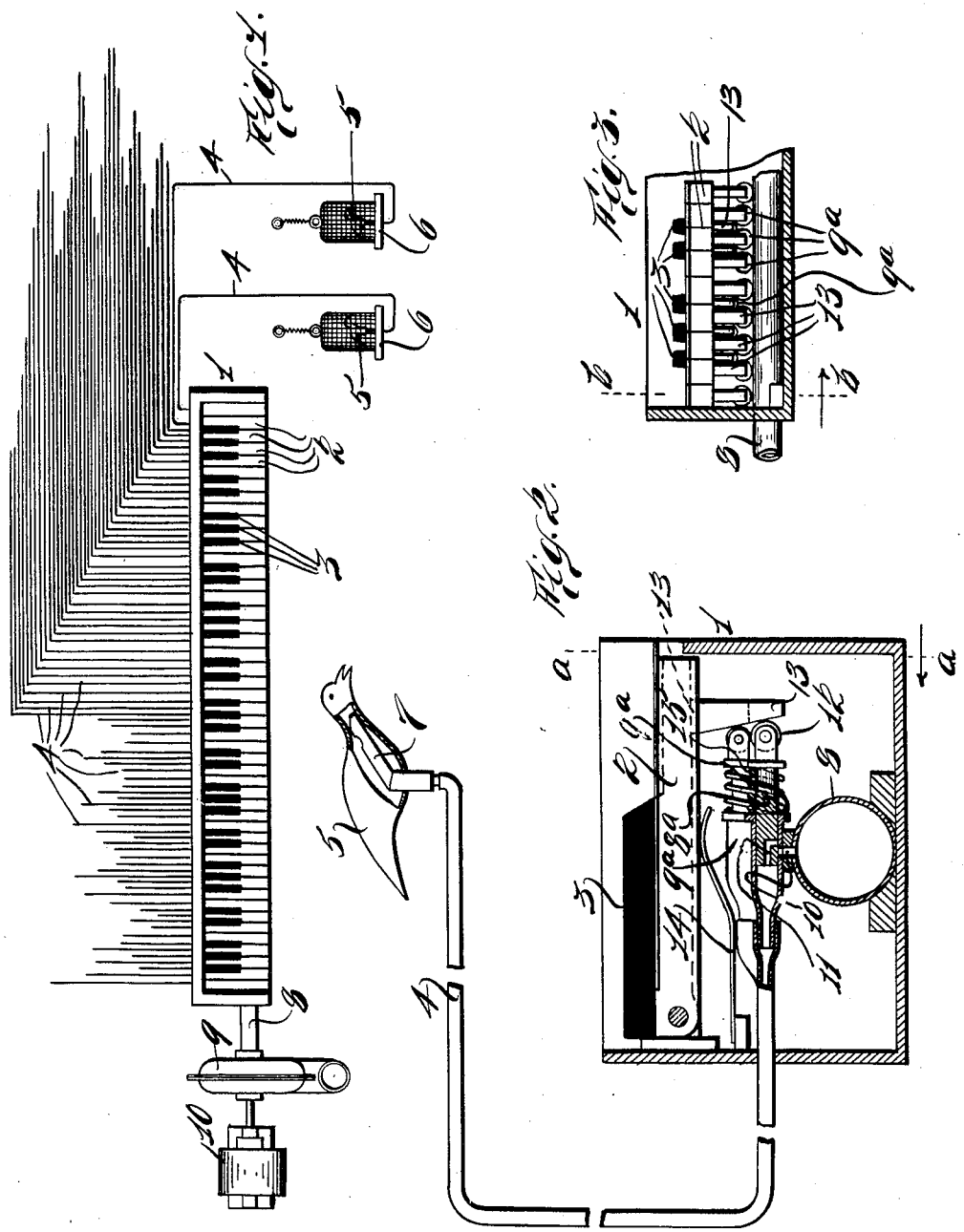

UNITED STATES PATENT OFFICE.

EDWIN S. MAYLAND, OF NEW YORK, N. Y.

MUSICAL DEVICE.

1,100,898.  Specification of Letters Patent.  Patented June 23, 1914.

Application filed August 6, 1913. Serial No. 783,310.

*To all whom it may concern:*

Be it known that I, EDWIN S. MAYLAND, a citizen of the United States, residing at Brooklyn, in the county of Kings, city and State of New York, have invented certain new and useful Improvements in Musical Devices, of which the following is a clear, full, and exact description.

This invention relates to an improvement in musical devices, particularly adapted for conservatories, cabaret performances, etc.

The object of this improvement is to construct a musical device consisting of a plurality of artificial birds, preferably in cages, the cages to be hung among the floral decorations of a room or banquet hall. The birds will contain whistles, or other sound producing devices, the said whistles or sound producing devices to be preferably pneumatically operated, the pneumatics being controlled by a key-board. The sound producing elements in the birds will be tuned to correspond to the tones represented by the keys of the key-board.

When the key-board is manipulated the birds will give forth the musical tones, preferably whistling the selection played. The effect obtained by my improved device will be pleasing as every part will be concealed, except perhaps the cages containing the artificial birds, hence the selection will appear to issue from the birds.

In the accompanying drawing, Figure 1 is a diagrammatic plan view of my improved device, two cages only being shown as connected to the key-board. Fig. 2 is an enlarged cross sectional view, the section being taken on a line $b$—$b$ in Fig. 3. Fig. 3 is a longitudinal section of one end of the key-board, the section being taken on a line $a$—$a$ in Fig. 2.

In the drawing, which illustrates one manner of carrying my idea into practice, 1 indicates a key-board similar to a piano key-board, having the white keys 2 and black keys 3. Each white key 2 and each black key 3 is connected by a pipe 4 either flexible or rigid, to an artificial bird 5 located in a cage 6. Although but two artificial birds are indicated, it will be understood that each pipe 4 connects a bird with a key of the key-board; hence there are as many birds as there are keys 2 and 3.

Each bird 5 contains a sound-producing element, in this instance a whistle 7 (Fig. 2), which is attached to a pipe 4. The other end of each pipe 4 is connected to a main wind chest 8, the other end of which is connected to a blower or fan 9, the said fan being operated by an electric motor 10. To control the flow of air through the pipes 4 I have in this instance provided valves $8^a$, one in the open end of each pipe 4, or rather in a cylinder $9^a$, which is attached to each pipe 4. Openings 10, one only being shown, provide a duct from the wind chest 8 to the cylinders 9. The valves $8^a$ are designed to move longitudinally of the cylinders 10 and each valve $8^a$ is provided with a port 11, through which the air will flow into the pipe 4, controlled thereby, when a key 2 or 3 is depressed. Each valve is provided with a roller 12, which is kept in contact with a cam block 13 in an adjacent key 2 or 3. When a key 2 or 3 is depressed its valve $8^a$ will move inwardly until its part 11 alines with the opening or passage 10 at which time air will flow through the pipe 4, controlled by said valve and the sound-producing element 7, in the bird, connected to the pipe, will operate. A spring 14 returns the key after the depression thereof, likewise a spring 15 returns the valve $8^a$.

I claim as my invention:

In a musical device, in combination, a plurality of artificial birds adapted to be positioned about the interior of a room whereby they may be seen, a whistle of predetermined pitch connected with each artificial bird, a common source of air supply, separate means connecting said source with the whistles, a key-board, and means adapted to be operated thereby to establish communication between the source and the whistle, the pitch of which corresponds to the key depressed.

Signed at New York city, New York, this 4th day of August 1913.

EDWIN S. MAYLAND.

Witnesses:
MABEL DITTENHOEFER,
FRED F. WEISS.

Copies of this patent may be obtained for five cents each, by addressing the "Commissioner of Patents, Washington, D. C."